(12) United States Patent
Bacher et al.

(10) Patent No.: US 6,994,795 B2
(45) Date of Patent: Feb. 7, 2006

(54) DEVICE AND METHOD FOR THE FILTRATION OF VISCOUS MATERIAL

(76) Inventors: Helmut Bacher, Schmidbergerweg 5, A-4490 St. Florian (AT); Helmuth Schulz, Badstrasse 20, A-4490 St. Florian (AT); Georg Wendelin, Waldbothenweg 84, A-4033 Linz (AT)

(*) Notice: Subject to any disclaimer, the term of this patent is extended or adjusted under 35 U.S.C. 154(b) by 404 days.

(21) Appl. No.: 10/380,974

(22) PCT Filed: Sep. 19, 2001

(86) PCT No.: PCT/AT01/00296
§ 371 (c)(1), (2), (4) Date: Mar. 18, 2003

(87) PCT Pub. No.: WO02/26472
PCT Pub. Date: Apr. 4, 2002

(65) Prior Publication Data
US 2003/0178740 A1 Sep. 25, 2003

(30) Foreign Application Priority Data
Sep. 26, 2000 (AT) .................................. A 1627/2000

(51) Int. Cl.
B01D 29/96 (2006.01)

(52) U.S. Cl. .................. 210/780; 210/387; 210/418; 210/445; 210/447; 425/197; 425/561

(58) Field of Classification Search ............ 210/107, 210/387, 400, 418, 445, 447, 780, 783; 425/197, 425/198, 382.4, 557–561
See application file for complete search history.

(56) References Cited

U.S. PATENT DOCUMENTS

| 3,706,827 A | 12/1972 | Nott et al. |
| 4,410,477 A | * 10/1983 | Claude ................... 264/169 |
| 4,842,750 A | * 6/1989 | Britchi .................. 210/791 |

FOREIGN PATENT DOCUMENTS

| EP | 0 221 355 A1 | 5/1987 |
| EP | 0 976 525 A1 | 2/2000 |
| JP | 08156072 | 6/1996 |

* cited by examiner

Primary Examiner—Matthew O. Savage
(74) Attorney, Agent, or Firm—Townsend and Townsend and Crew LLP

(57) ABSTRACT

An apparatus for filtering viscous material, in particular thermoplastic synthetic plastic material, comprises a screw (24), which presses the material to be cleaned from an upstream conduit (3) of a supply housing (2) towards a band-shaped screen (4). The screen (4) is abutted on its downstream side by a perforated plate (6) against the pressure of the supplied material. The band-shaped screen (4) can be displaced for replacement of a soiled band section by a fresh band section. For facilitating this displacement a device is provided, which comprises a closure means (30) that is disposed on the upstream side of the screen (4), by which closure means the upstream conduit (3) for the material to be filtered can be closed at least substantially. On the upstream side of this closure means (30) a storage space (36) for material to be cleaned is connected to the upstream conduit (3). Within this storage space (36) a piston (38) is sealingly guided, which is reciprocable by a drive means and closes in its projected position the storage space (36) against the upstream conduit (3).

15 Claims, 3 Drawing Sheets

DEVICE AND METHOD FOR THE FILTRATION OF VISCOUS MATERIAL

Figure 1:
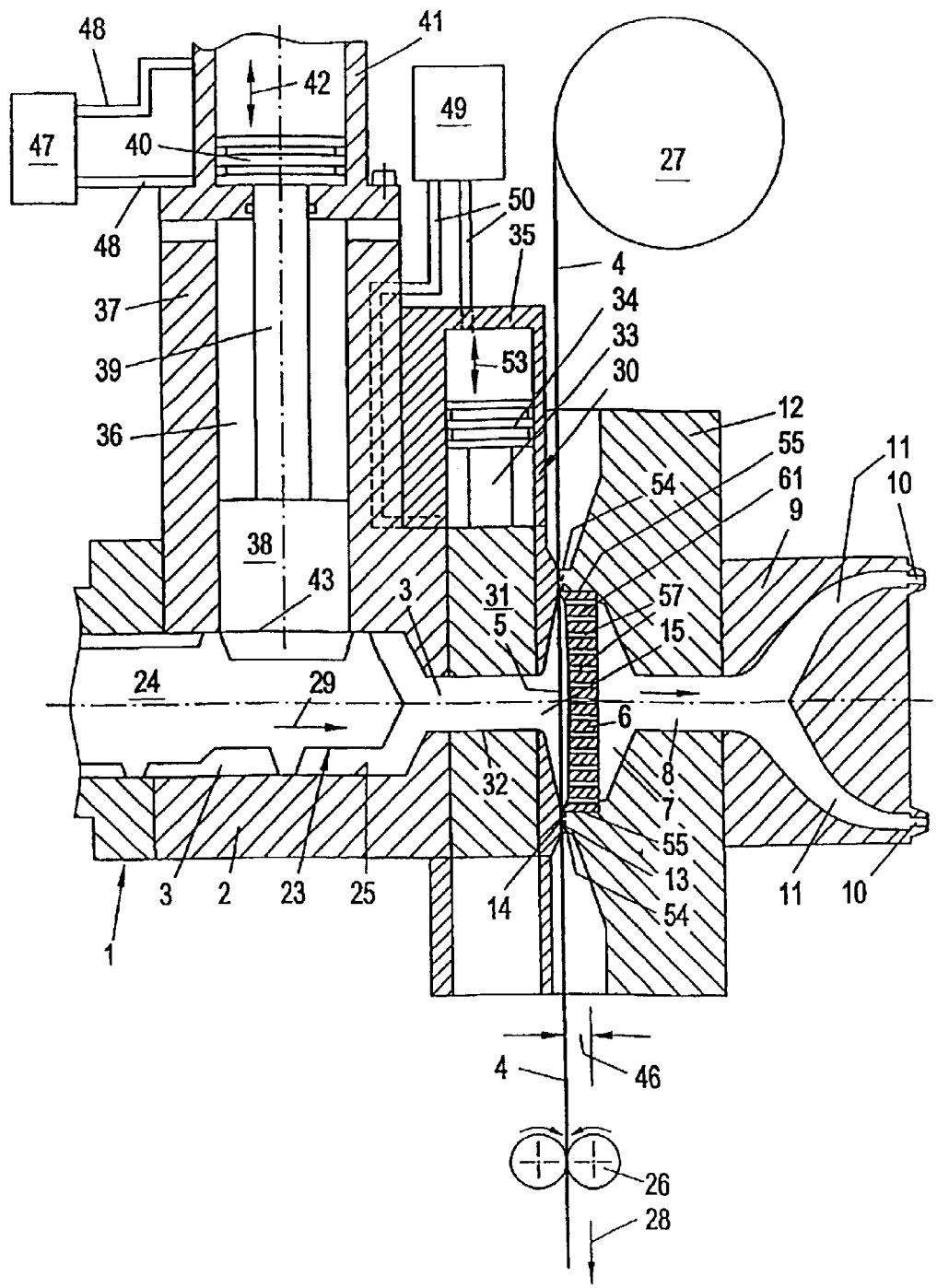

The invention refers to an apparatus for filtering viscous material, in particular thermoplastic synthetic plastic material, comprising a means, in particular a screw, which presses the material to be cleaned from an upstream conduit of a supply housing towards a band-shaped screen which on its downstream side is supported by a perforated plate against the pressure of the supplied material and is slidable crosswise the flow direction of the material to be cleaned for replacement of a soiled band section by a fresh band section, wherein a means for facilitating of this displacement is provided which comprises a storage space for material to be cleaned connected to the upstream conduit, in which storage space a piston is sealingly guided that is reciprocable by a drive means and in its projected position closes the storage space against the upstream conduit. Further, the invention relates to a process for filtering viscous material.

Within a known apparatus of this kind (EP 221 355 B) the volume of the space in front of the screen is temporarily changed for facilitating displacement of the band, so that the pressure exerted onto the screen by the material to be cleaned is so changed by this volume change that the screen can be further dislocated. The expenditure necessary for this is considerable and also this apparatus cannot easily be operated because the volume increase of the space in front of the screen must be coordinated with the supply of the material to be filtered. However, this supply is not always constant, for example then not, when the screw conveying the material to be filtered is nonuniformly fed.

The invention has as its object to improve an apparatus of this kind so that the mentioned disadvantages are avoided and that the apparatus can be operated with less constructive effort in a simple and reliable manner. The invention solves this task by the features that the means for facilitating displacement of the screen comprises also a closure means disposed on the upstream side of the screen, by which closure means the upstream conduit for the material to be filtered at least for the most part can be closed, and which closure means, when seen in flow direction of the material to be cleaned, is disposed between the storage space and the screen. Therefore, the constructive effort is reduced to the closure means and the storage space having the piston guided within it. These elements can be easily manufactured, the use of usual constructive elements is possible. The construction can also be easily operated. When the soiled screen band section should be replaced, the closure means must only be brought as far into its closure position that the pressure exerted onto the screen by the material to be filtered is reduced to such an extent that shifting of the screen is possible. The damming up of the processed material caused by the closure means on the upstream side of the closure means is taken up by retracting the piston from its originally projected position so that the volume of the storage space is made free to take up the supplied material to be filtered. If this storage space has a sufficient great volume, the replacement of the screen section can be made so that the supply of the material to be filtered is not disturbed, and the inventive apparatus is also independent from irregularities in the supply of the material to be filtered. As soon as the soiled band section is replaced by a fresh band section, the closure means is opened again, so that the supply of the material to be filtered towards the screen is made free again. Simultaneously, the piston is again moved into its projected position and thereby presses the soiled material contained within the storage space out of the storage space. Within this, it is of advantage that the material pressed out of the storage space is mixed again with the material to be filtered that is supplied via the upstream conduit, so that the flow of the material reaching the filter is very good homogenised. Therefore, no soiled material can reach the downstream side of the filter.

In particular when thermoplastic plastic materials are filtered, very high pressures occur within the material to be filtered, which pressures can reach 300 bar and more. These high pressures act onto the screen and press it against the perforated plate. The friction forces caused thereby impede conveyance of the screen in order to replace a soiled screen section. Just within such apparatus operating under high pressure, the invention is of substantial advantage, however, it is also applicable with advantage at apparatus operating at low pressures, for example when juices of fruits or vegetables are filtered, and the like. Whereas within the latter fields of operation, a regular supply of the material to be filtered is not so of importance so that the device conveying such material within the upstream conduit can be formed, for example, by one or more slides or pistons conveying into this conduit, when filtering synthetic plastic material, in particular thermoplastic plastics, a regular supply of this material towards the filter screen should be aimed at, since mostly the filtered material is supplied to a granulating apparatus following the screen or to at least one mould via an extruder. An irregular supply of the material towards the screen, therefore, would cause an irregular quality of the material or of the products obtained therefrom at the granulating apparatus or within the mould. Within apparatus filtering plastics, therefore, always a screw is used for conveying the material to be filtered within the upstream conduit. Within this, according to a preferred embodiment of the invention, the front surface of the piston facing the upstream conduit is shaped according to the inner wall of the housing of the screw, so that in the projected position of the piston that cannot be rotated, its front surface is brushed over by the volutions of the screw. This has a consequence that after each storage action, the entire content of the storage space is fed to its filtration, so that no rests of plastics material can remain on the front surface of the piston. Thereby, a thermic damage of the material to be filtered is at least almost avoided and is as less as quicker the soiled screen band section is replaced. This requires that the friction forces acting onto the screen at its displacement are kept as less as possible. This, in turn, has as a consequence that the sealing of the band section of the band filter just being in filtering operation required for obtained the necessary tightness of the supply conduit, is abolished. In order to perform this within the spirit of the invention, according to a further embodiment of the invention, the perforated plate or a plate carrier supporting it is pressed against the supply housing by a clamping means that can be loosened, whereby the screen conducted between the perforated plate carrier and the supply housing is tightened in the clamping position of the clamping means. When this clamping action of the clamping means is relieved, tightening of the screen band section used heretofore for filtering is relieved and this screen band section can be shifted without any problem, inasmuch this screen band section is no more pressed against the perforated plate, since the closure means brought into its closure position causes that on the upstream side of the screen the pressure is substantially decreased, and is reduced to zero if a complete closure is obtained. If according to the invention, the clamping means is formed by hydraulic cylinders, the relieve of the clamping action can be obtained within a very short time so that, if the motions of the closure means, of the piston and of the screen displacement are suitably harmonised, the replacement of the soiled screen band section and the fresh tightening of the screen section and the backward motion of the closure means and of the piston can be made within a short time. As quicker these operations can be made, the less is the danger of a thermal damage of the processed material.

In general, the closure means can be formed by any suitable valve, however, a particular suitable embodiment consists in a slide movable crosswise to the axis of the upstream conduit. The direction of motion of this slide is suitably chosen parallel to that of the piston of the storage space, because such an embodiment enables one to provide in a simple manner one single drive means for motion of the slide and of the piston of the storage space.

It has been shown that it is suitable to provide a flat depression at that side of the perforated plate that faces the screen. Into this depression, the screen is put in by the pressure of the material, the occurring slight stretch of the screen is within the range of the deformability of the wire-web forming the screen. In such a manner a space is obtained on the upstream side of the sieve for taking up the impurities.

The inventive process for exchanging a screen section when filtering viscous materials, in particular flowable plastics material, starts from a process in which the material is supplied by a supply means, in particular a screw, within a supply conduit under pressure to the upstream side of a band-shaped filter screen, a section of which is kept sealed during the filtration operation, whereas, when the screen section should be exchanged, sealing of the screen band is relieved and then the screen band is displaced crosswise to the flow direction of the material to be filtered, until the soiled band section is replaced by a fresh band section, whereupon then sealing of this fresh band section is again produced, wherein during shifting of the screen band, the material to be filtered is enabled to flow into a storage space connected to the supply conduit. The inventive process is characterized in that the supply of the material to be filtered towards the screen band is highly throttled, preferably entirely closed, and that substantially simultaneously therewith the flow of the material to be filtered into the storage space is enabled on the upstream side of the position of throttling or closure, and that soon after throttling or closure of the supply of the material towards the screen band its sealing is relieved and the sieve is displaced, whereupon after re-sealing the band, the supply of the material to be filtered towards the screen band is made free again, wherein the material that has entered the storage space is pressed out of the storage space and is again introduced upside the throttling or closure location into the flow of the material flowing towards the screen band. Such a process can be easily performed and controlled. For high pressures occurring within the material to be filtered it is recommended to completely stop the supply towards the screen band in order to avoid that the material escapes after abolishing sealing of the screen band.

In the drawings, an examplative embodiment of the inventive apparatus is schematically shown.

FIG. 1 shows the apparatus in a horizontal section.

Figure 2:
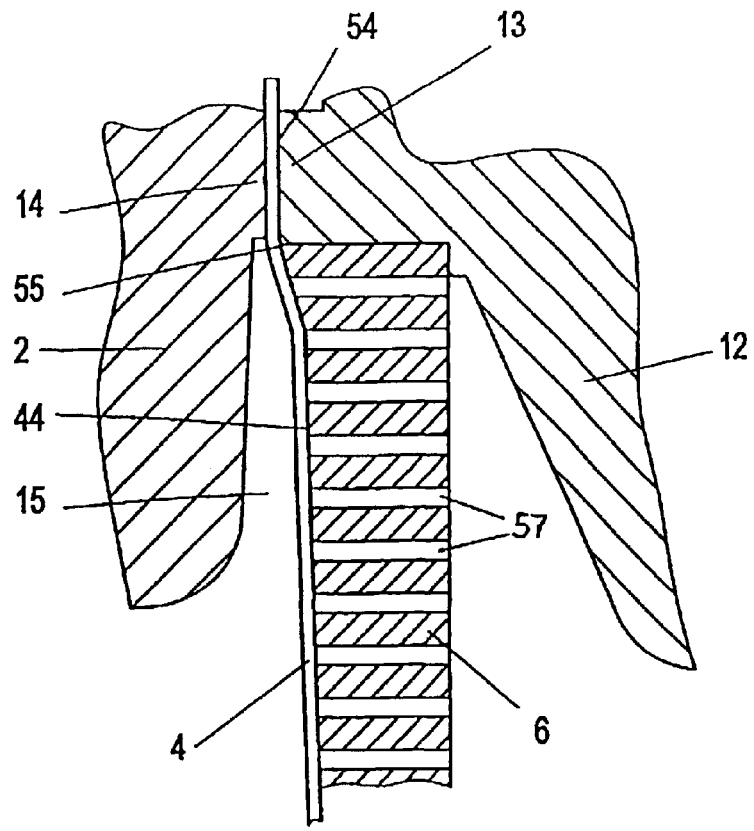
Figure 3:
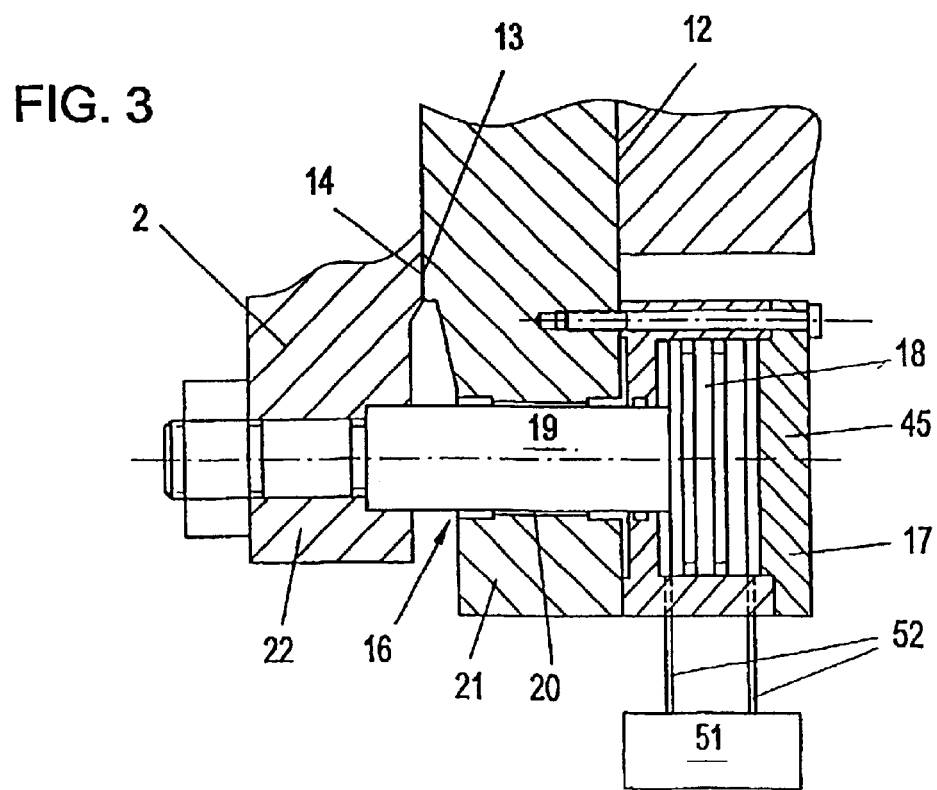

FIGS. 2 and 3 each show a detail in an enlarged scale in a horizontal direction or, respectively, in a vertical section.

Figure 4:
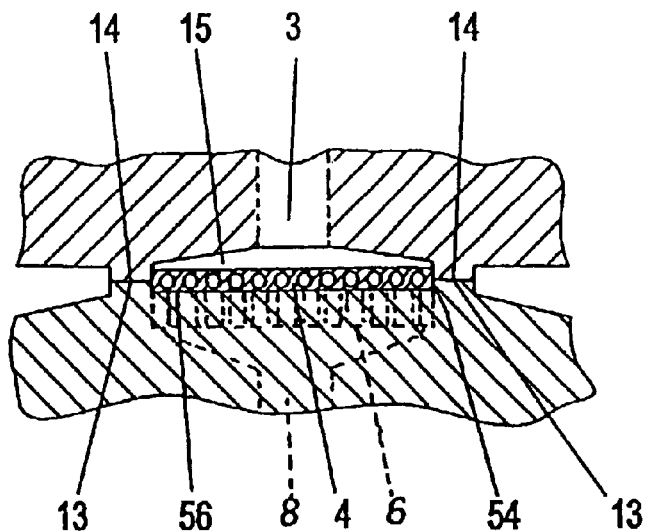

FIG. 4 is a section taken through the sealing location of the screen, seen in direction of motion thereof.

Figure 5:
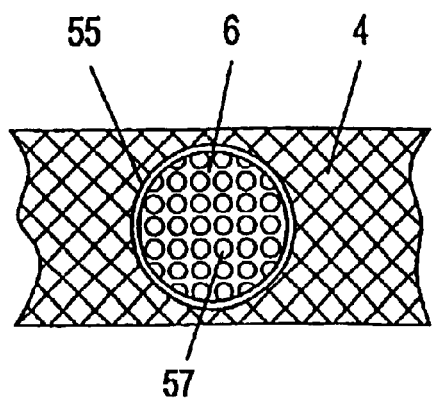
Figure 6:
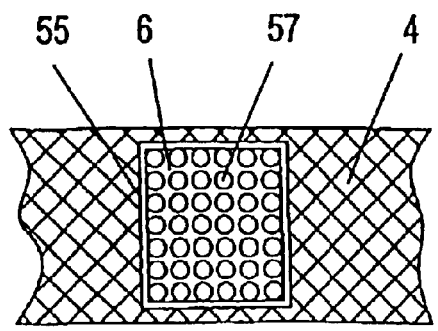

The FIGS. 5 and 6 each show an embodiment variant for sealing the screen, seen perpendicularly to its plane.

The apparatus comprises a framework 1 that is only partially shown, which carries a supply housing 2. Within this housing 2, an upstream conduit 3 is provided through which the material to be filtered is pressed against a band-shaped screen 4, which consists of a woven metal net, the meshes thereof are so fine that the impurities to be separated from the material to be filtered are retained at the upstream side of the screen 4. When filtering thermoplastic plastics masses, in particular recycling material, these impurities are mostly formed by dust or small stones, however, also metal parts occur, such as paper clips, wire stitches, small screws, nails and the like as well as solid particles of other kind. Since the material to be filtered is supplied through the upstream conduit 3 under a more or less high pressure, the screen 4 in its just operative section 5 is abutted by a perforated plate 6, the holes 57 thereof are sufficient great to allow the filtrate that has passed the sieve 4 pass the holes of the plate 6 without any problem. This filtrate reaches then a collection space 7 disposed behind the plate and streams from it through a conduit 8 to a granulating head 11 which comprises a plurality of distribution channels 9 leading to nozzles 10. To the nozzles 10 a granulating apparatus (not shown) may be connected which subdivides the material strands discharging from the nozzles 10 into granules and conveys off these granules after cooling them. The perforated plate 6 is supported within a plate carrier 12, which forms a protrusion 13 surrounding the perforated plate, which protrusion, for example, is annular shaped, the screen 4 being guided over the front surface 56 (FIG. 4) of this protrusion within a recess 54 of this front surface 56. Opposite to the protrusion 13, a protrusion 14, for example annular shaped, is provided, which is formed by the front surface of the supply housing 2 facing the screen 4. This protrusion 14 confines a funnel-shaped enlargement 15, into which the upstream conduit 3 leads, the greatest dimension of the enlargement being equal to that of the perforated plate 6. The screen 4 is disposed between the two protrusions 13, 14. In order to avoid that material to be filtered, which mostly is supplied under a more or less high pressure, escapes between the protrusions 13, 14 to the outside, the protrusions 13, 14 are pressed against each other and, therefore, sealingly clamp the screen 4 disposed between them within the recess 54. For this, a disengageable clamping means 16 (FIG. 3) is provided which comprises hydraulic cylinders 17 within which hydraulic pistons 18 are guided, which are actuated by a drive means 51 via hydraulic lines 52. The pistons 18 are connected to rods 19, which are guided through bores 20 in a flange 21 of the plate carrier 12 and are screwed to a flange 22 of the supply housing 2. When the pistons 18 within the cylinders 17 are moved towards the right, the two flanges 21, 22 are drawn against each other so that the screen 4 disposed between the protrusions 13, 14 is sealingly clamped and an escape of the material to be filtered from the enlargement 15 (FIG. 1) to the outside is avoided. In order to enable one to supply the material to be filtered under pressure, a supply means 23 is provided which in the embodiment shown is formed by a screw 24 bearingly supported within a bore 25 of the supply housing 2 and conveying the material to be filtered in direction of the arrow 29. Thereby, thermoplastic synthetic plastic material is plasticised and transferred into a condition in which it can be filtered.

A variant for sealing the screen 4 consists in to form the edge 55 of the perforated plate 6 as a sealing surface, whereby the protrusion 13 may, act as an additional sealing. Within such an embodiment, the clamping means 16 with its hydraulic cylinders 17 could act directly onto the perforated plate 6, so that the granulating head 9 and the plate carrier 12 must not change their position when the screen band 4 is displaced. Two embodiments for such a perforated plate 6 sealing the screen 4 are shown in FIGS. 5 and 6. The embodiment according to FIG. 6 is more favourable than that of FIG. 5, because the square-shape cross section of the perforated plate 6 better utilises the active screen surface.

The impurities contained in the supplied material and separated by the screen 4 are collected at the upstream side of the screen 4 and cause that the active screen section by and by is closed and therefore, is impaired in its sieve action. Therefore, this soiled screen section must be replaced by a fresh screen section from time to time. For this, the band-shaped screen 4 rolled up on a screen roller 27 is displaced by means of a pulling-off means 26 in direction of the arrow 28 so far that the soiled band section is replaced by a fresh band section. Before this displacement is performed, however, the clamping means 16 is disengaged, since otherwise the screen clamped between the protrusions 13, 14 would avoid conveyance of the screen or would at least heavily obstruct it. Then, there would be the danger of a tear of the screen. The disengagement of the clamping means 26 is made by controlling the hydraulic piston 18 so that the rods 19 are displaced towards the left (FIG. 3).

In order to avoid that the pressurised material to be filtered can escape to the outside from the space constituted by the enlargement 15 after detachment of the tightening clamping of the screen 4 between the protrusions 13, 14, a closure means 30 is provided which is disposed on the upstream side of the screen 4 and is formed by a slide 31 movable crosswise to the longitudinal axis of the upstream conduit 3 and having a passage opening 32, which connects in the open position of the closure means 30 the upstream conduit 3 with the enlargement 15. By a piston rod 33 the slide 31 is connected to the piston 34 of a hydraulic cylinder 35, which is connected by hydraulic lines 50 to a drive means 49. Thereby, the slide 31 can be displaced in direction of the double arrow 53 from the open position shown in FIG. 1 into a position closure in which it mainly or completely closes the upstream conduit 3, and also back into its open position. This closure has as a consequence that the pressure of the material disposed within the enlargement 15, which pressure presses in the operation position of the apparatus the screen 4 against the perforated plate 6 abutting it, is considerably decreased when the closure is mainly closed or completely relieved when the closure is completely closed, since there is a large or complete compensation of the pressures of the material masses disposed within the spaces 15 and 8. When the clamping means 16 is disengaged in the closure position of the closure means 30, the screen 4 can be displaced by means of the pulling off means 26 without any problem until the soiled band section is replaced by a fresh band section.

When the closure means 30 has reached its closure position, the material conveyed by the screw 24 cannot further flow in direction of the arrow 29. In order to avoid that the screw 24 must be stopped, what is undesirable, a storage space 36 is connected to the upstream conduit 3 and is confined by a cylinder 37 in which a piston 38 is sealingly guided, which by means of a piston rod 39 is connected to a hydraulic piston 40 guided within a hydraulic cylinder 41. For displacement of this piston 40 in direction of the double arrow 42, a drive means 47 is provided, the hydraulic lines of which are designated by 48.

When the slide 31 is brought into its closure position, simultaneously the piston 38 is retracted so that the storage space 36 is made free for the inflow of the material conveyed by the screw 24. The volume of the storage space 36 is so great that it can take up the complete material conveyed by the screw 24 during the closure position of the slide 31. As soon as the slide 31 is displaced again into its open position, the piston 38 is projected again and presses the material disposed within the storage space 36 again out of this space. The material mass pressed out thereby is introduced into the material flow conveyed by the screw 24 and is mixed therewith, so that always almost homogenous material reaches the screen 4 for filtering.

In the projected position of the piston 38 shown in FIG. 1, its front surface 43 constitutes a smooth continuation of the inner wall of the housing of the screw 24 formed by the bore 25. Thereby, the advantage is obtained that, when the screw 24 is rotated, its volutions brush over the front surface 43 and thereby scrape off material adhering to this front surface. Thereby it is avoided that residues of material can remain within the supply channel 3 for an inadmissible long time. The only pre-condition for this is that the piston 38 cannot be rotated around the longitudinal axis of the storage space 36, but this construction can easily be ensured.

The perforated plate 6 (FIG. 2) has on its upstream side a flat depression 44, into which the screen 4 is pressed by the pressure of the material processed. Thereby the sieve 4 is somewhat stretched, but this can be tolerated in view of the admissible deformability of the wire-web. This depression constitutes a space that takes up the impurities retained by the screen 4 on its upstream side.

As already mentioned the sieve 4 is displaced in a rhythmic manner in direction of the arrow 28, what is facilitated by the fact that the supply housing 2 and the plate carrier 12 can be displaced relative to each other in axial direction of the upstream conduit 3. For this displacement, the clamping means 16 can be made use of, if the hydraulic piston 18 within the hydraulic cylinder 17 can be so actuated that it engages the front wall 45 of the hydraulic cylinder 17. Since the rod 19 is screwed to the flange 22 of the supply housing 2, the said engagement causes that the flange 21 and therefore the perforated plate carrier 12 is drawn off the supply housing 2. Thereby, a gap of sufficient width is created between the protrusions 13, 14 so that the screen 4 together with the layer of impurities adhering on its upstream side can be drawn off without any problem. The displacement width 46 forming this gap is schematically shown in FIG. 1.

In FIG. 1 the operation position of the apparatus is shown in which the material conveyed by the screw 24 is filtered. When the soiled band section must be replaced, at first the slide 31 is displaced into the closure position, so that the material supply towards the screen 4 is at least substantially shut off. Substantially simultaneously, the piston 38 is retracted so that the storage space 36 is made free in order to take up the material conveyed by the screw 24. As soon as the slide 31 has reached its closure position, the clamping means 16 is so actuated that the supply housing 2 and the plate carrier 12 are removed from each other. Thereby, the tightening clamping of the screen 4 at the protrusions 13, 14 or, respectively, at the edge 55 of the perforated plate 6 is relieved and the screen 4 can be moved for the desired band section in direction of the arrow 28 by means of the pulling off means 26. Thereby, the respective band section is drawn off the sieve roller 27. As soon as the fresh band section is disposed in front of the abutted plate 6 in a proper manner, the clamping means 16 is again so actuated that the supply housing 2 and the plate carrier 12 are drawn against each other. Thereby, the screen 4 is again sealingly clamped between the protrusion 14 and the protrusion 13 or, respectively, between the protrusion 14 and the edge 55 of the plate 6. As soon as this is performed, the slide 31 is again retracted in its open position so that the screw 14 can again convey material towards the screen 4. Simultaneously, with the motion of the slide 31, the piston 38 is moved towards the screw 24 and presses the material contained within the storage space 36 into the supply channel 3. Any material residue is scraped off the front surface 43 of the piston 38 by the volutions of the screw 24, so that no coking of the material can occur.

The timing and harmonisation of the motions of the slide 31, of the piston 38 and of the clamping means 16 can easily be obtained by a suitable control means, suitably in an electronic manner. By suitable valves, one can also ensure that the said motions can be derived from one single drive means only, so that, therefore, the drive means 47, 49 and 51 can be combined. Constructionally this is facilitated if the directions of motions of the slide 31 and of the piston 38 are directed parallel to each other.

What is claimed is:

1. Apparatus for filtering viscous material comprising a device pressing the material to be cleaned from an upstream conduit of a supply housing towards a band-shaped screen which on its downstream side is supported by a perforated plate against a pressure of the pressed material and is slidable crosswise a flow direction of the material to be cleaned for replacement of a soiled band section by a fresh band section, wherein a device for facilitating of this displacement is provided which device comprises a storage space for material to be cleaned, which storage space is connected to the upstream conduit, in which storage space a piston is sealingly guided, which piston is reciprocable by a drive means and in its projected position closes the storage space against the upstream conduit, the device for facilitating the adjustment of the screen comprising a closure means disposed on the upstream side of the screen, by which closure means the upstream conduit for the material to be filtered can be mainly closed, and which closure means, when seen in the flow direction of the material to be cleaned, is disposed between the storage space and the screen.

2. Apparatus according to claim 1, wherein the perforated plate or a plate carrier supporting the perforated plate is pressed against the supply housing by a clamping device, and wherein the screen conducted between the perforated plate or the plate carrier and the supply housing is sealingly supported in a clamping position of the clamping device.

3. Apparatus according to claim 2, wherein the clamping device is formed by hydraulic cylinders.

4. Apparatus according to claim 1, wherein the piston is a non-rotatable piston, and a front surface of the non-rotatable piston facing the upstream conduit is formed matching an inner wall of the housing of the screw, so that in a projected position of the piston its front surface is brushed over by volutions of the screw.

5. Apparatus according to claim 1, wherein the closure means is formed by a slide that is displaceable crosswise to the axis of the upstream conduit.

6. Apparatus according to claim 5, wherein a direction of motion of the slide is directed parallel to a direction of motion of the piston.

7. Apparatus according to claim 5, wherein the motions of the slide and of the piston are derived from a common drive means.

8. Apparatus according to claim 2, wherein the supply housing and the perforated plate or the plate carrier are displaceably arranged relative to each other in an axial direction of the upstream conduit.

9. Apparatus according to claim 8, wherein the clamping device serves for a relative displacement of the supply housing and of the perforated plate or of the plate carrier.

10. Apparatus according to claim 7 wherein the perforated plate or a plate carrier supporting the perforated plate is pressed against the supply housing by a clamping device, and wherein motions of the clamping device are also derived from the common drive means.

11. Apparatus according to claim 1, wherein the perforated plate on its side facing the screen comprises a flat depression.

12. Apparatus according to claim 1 wherein the device pressing the material towards the band-shaped screen includes a screw.

13. Process for replacement of a sieve section when filtering viscous material which is supplied under pressure within an upstream conduit to an upstream side of a band-shaped filter screen by means of a conveying device, a section of the screen being sealingly abutted to the outside during the filtration operation, whereas during the exchange of the screen section this sealing of the screen band is relieved and then the screen band is displaced crosswise to a flow direction of the material to be filtered until a soiled band section is replaced by a fresh band section, whereupon this fresh band section is again sealed to the outside, wherein during displacement of the screen band an inflow of the material to be filtered into a storage space connected to the upstream conduit is enabled, wherein a flow of the material to be filtered towards the screen band is mainly closed at a closure position, wherein substantially simultaneously therewith the inflow of the material to be filtered into the storage space is enabled at a location that is disposed upstream of the closure position, and wherein shortly after mainly closing the flow to the screen band, the sealing of the screen band is relieved and the screen is displaced, whereupon after the screen band has been sealingly abutted again, the flow of the material to be filtered towards the screen band is made free again, whereby the material that has entered the storage space is pressed out of the storage space and is again introduced into the flow of the material flowing towards the screen band at a location that is disposed upstream of the closure position.

14. A process according to claim 13 wherein the viscous material is supplied under pressure to the filter screen by a conveying device including a screw.

15. A process according to claim 13 wherein the flow of the material to be filtered towards the screen band is completely closed at the closure position.

* * * * *